Nov. 9, 1926.
C. A. HOPKINS ET AL
1,606,225
MACHINE FOR HUSKING AND CRACKING NUTS
Filed July 6, 1923        6 Sheets-Sheet 1
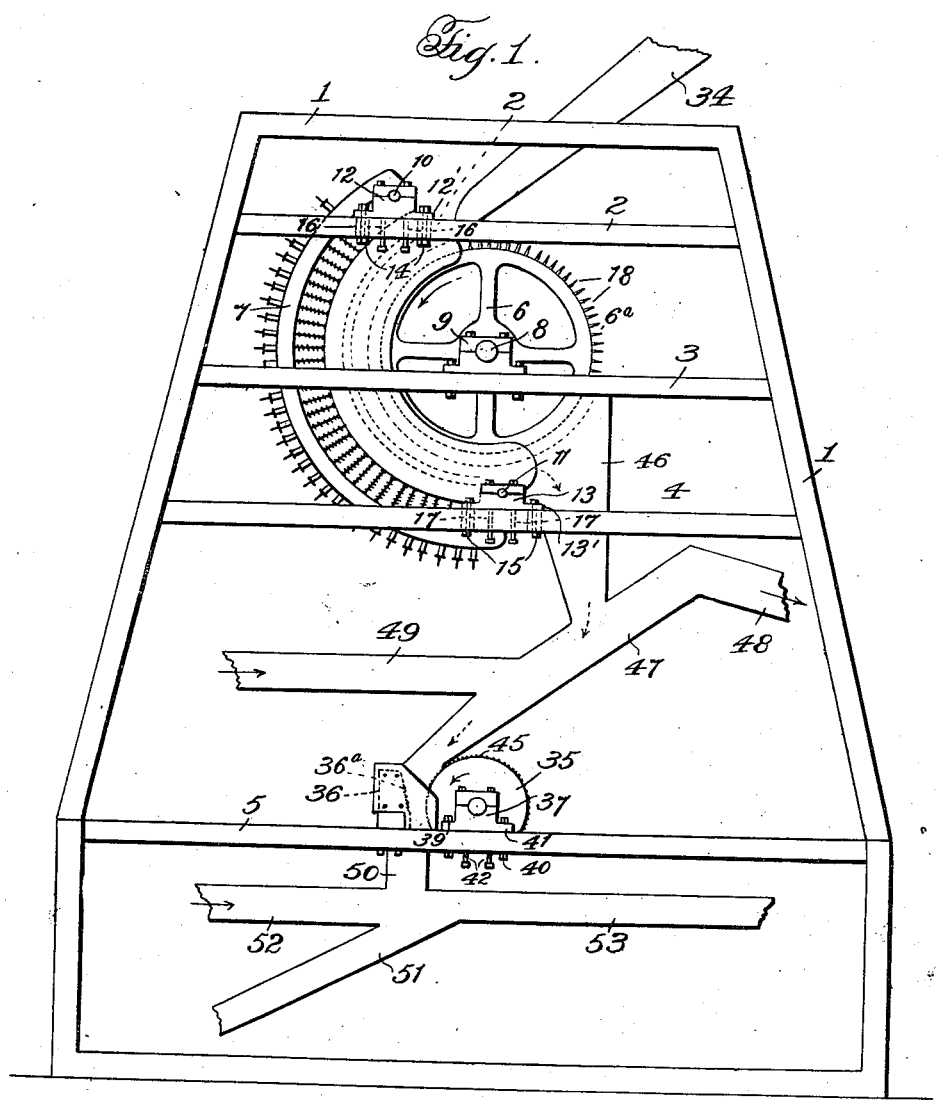
Witness:
Jas. E. Hutchinson
Inventors
Charles Andrew Hopkins
and Milton Robert Wood,
By Milans & Milans Attorneys

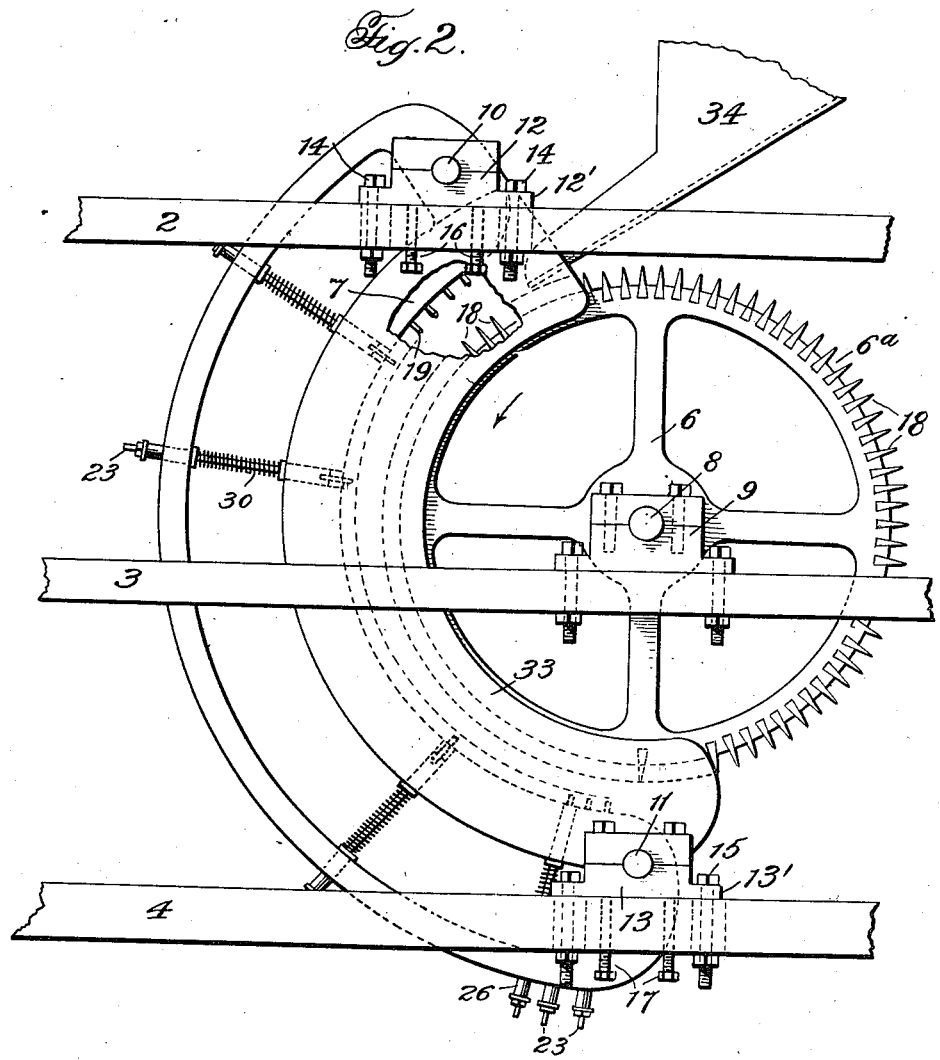

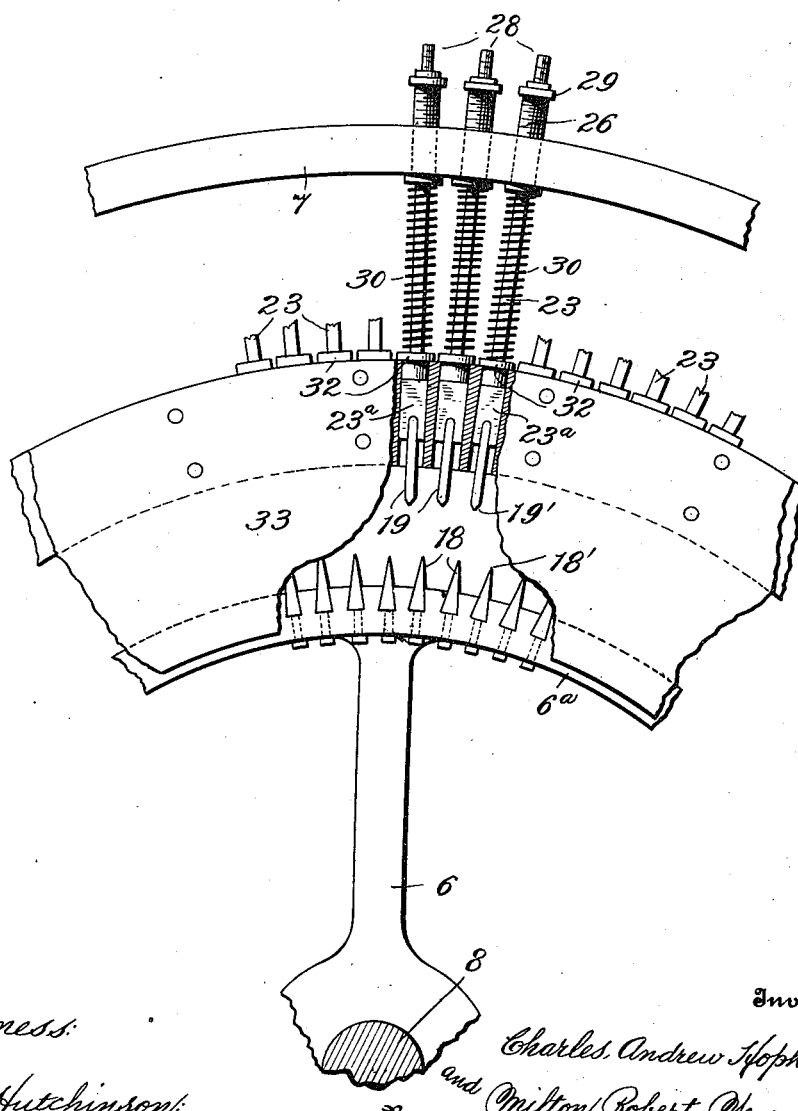

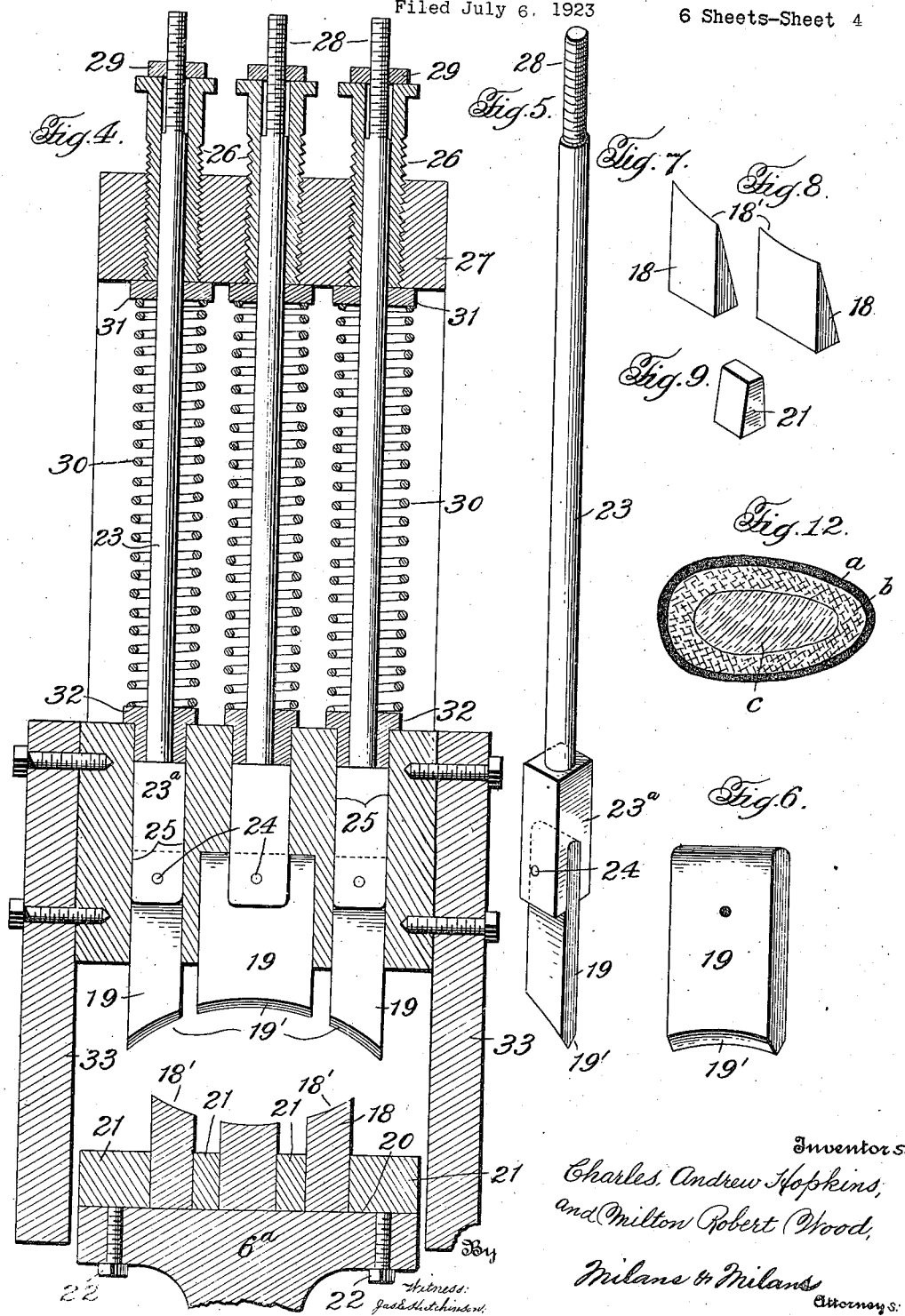

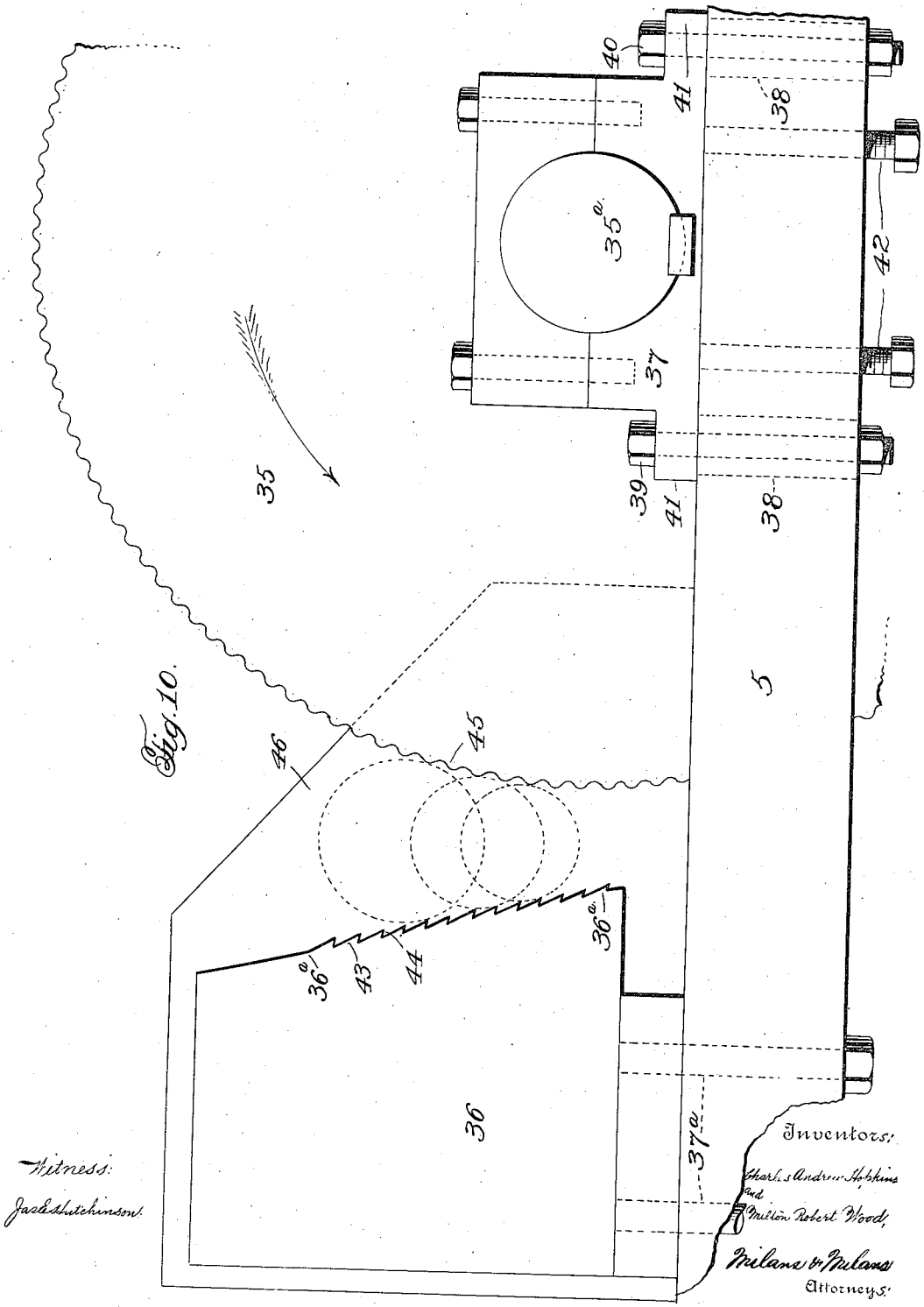

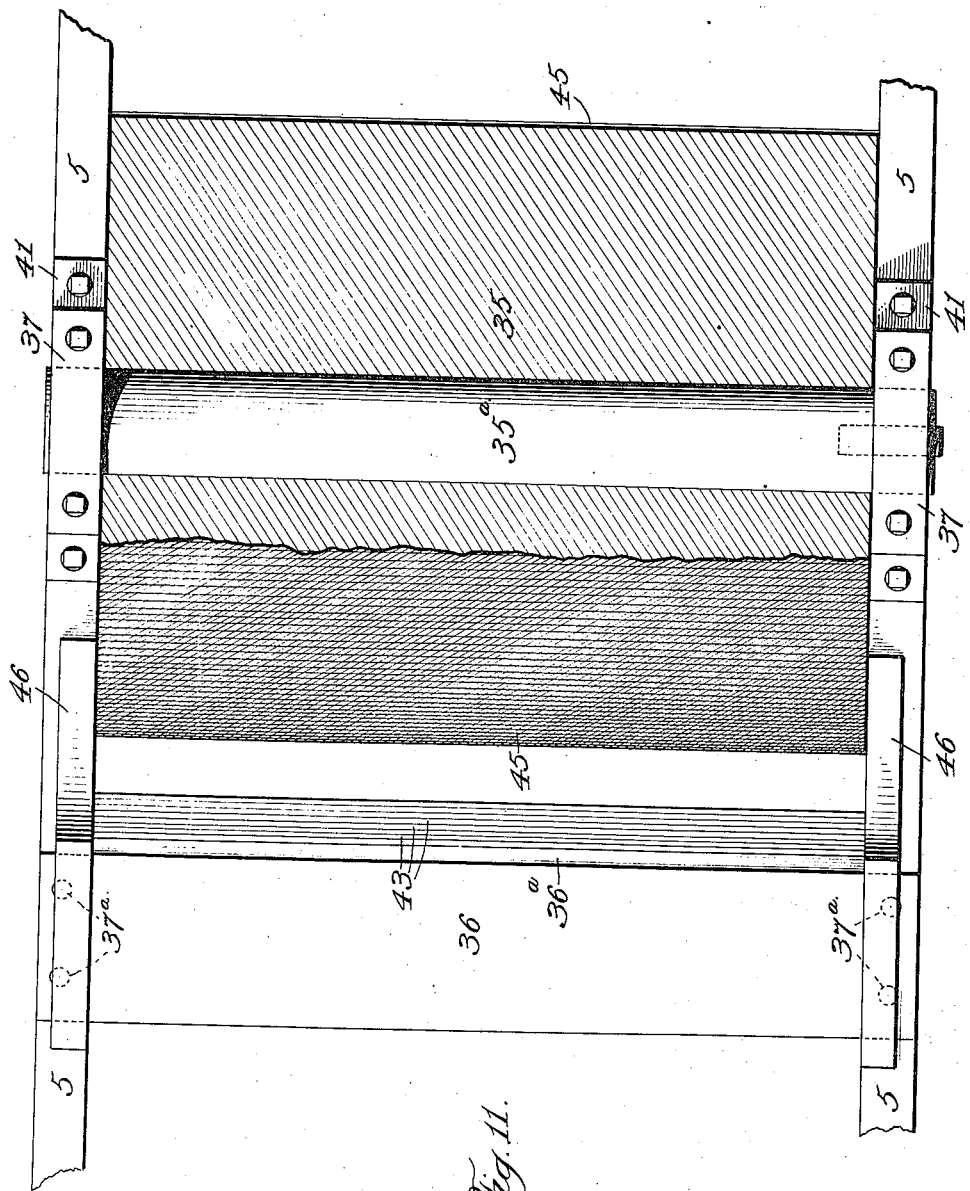

Patented Nov. 9, 1926.

1,606,225

UNITED STATES PATENT OFFICE.

CHARLES ANDREW HOPKINS AND MILTON ROBERT WOOD, OF SUGAR LAND, TEXAS, ASSIGNORS, BY DIRECT AND MESNE ASSIGNMENTS, TO TROPICAL PRODUCTS COMPANY, OF SAN FRANCISCO, CALIFORNIA, A CORPORATION OF CALIFORNIA.

MACHINE FOR HUSKING AND CRACKING NUTS.

Application filed July 6, 1923. Serial No. 649,968.

This invention relates to an improved machine for husking and cracking nuts, particularly nuts of the various species of the nut bearing palm trees, such as the "Attila palm", "Manaca palm", "Coyol palm" and other palms of the same or similar families.

The object of the invention is to provide an improved machine that will thoroughly and rapidly husk and crack nuts of varying sizes and shapes, and of different degrees of toughness of husk and hardness of shell without injury to the kernels; an improved machine that will accurately adjust itself to and be capable of husking and cracking nuts of varying sizes and shapes, and different degrees of toughness and hardness at the same time or operation without previous sorting or grading, that will apply the cracking force to the nuts to the best advantage to effect the cracking of the same with the minimum force or pressure required and without injury to the kernels, and to facilitate the separation of the kernels uninjured from the shells, to the end that the work of husking, cracking and separation, is much simplified and more effectually and expeditiously performed.

The invention, with other objects and advantages thereof, and the particular construction, combinations and arrangements of parts comprising the same, will be understood from the hereinafter contained detail description, when considered in connection with the accompanying drawings, forming part hereof, and illustrating one embodiment of the invention.

The invention comprehends husking mechanism comprising a revolving wheel or like part equipped with a series of fixed knives projecting from the peripheral portion thereof, and a cooperating relatively fixed concave member provided with series of spring pressed independently movable knives, the wheel member with its fixed knives being adapted to be rapidly revolved to rapidly roll the nuts to the concave, and the spring pressed independently movable knives of the concave being adapted to automatically adjust themselves to nuts of varying sizes and shapes, and different degrees of toughness, and cooperating with the fixed knives of the revolving wheel member to thoroughly peel the husks from the nuts.

The invention comprehends cracking mechanism comprising a fixed cracking block or member provided with a sloping or inclined roughened surface, and a cooperating rotary roll having a roughened surface, the cracking block or member being arranged to one side of the roll with its sloping roughened surface disposed opposite to the upper half of the cracking roll in spaced relation therewith and extending downwardly toward the same, the sloping surface of the fixed block or member and the curvature of the opposing face of the roll providing a space therebetween which gradually decreases in width or tapers downwardly, said cracking mechanism being adapted to operate on nuts of varying sizes and shapes, and to apply a breaking force to the nuts below the central portion thereof, the operation being in the nature of a pinching action, and this pinching force being always exerted on the nuts below the central part thereof irrespective of the size and shape of the nuts, and when the breaking of the nuts takes place, under this pinching action, the broken nuts flying upwardly away from the roll and then falling by gravity between the fixed member or block and the roll.

In the drawings:

Figure 1 is a side elevation illustrating a machine constructed in accordance with the present invention.

Fig. 2 is a detail side elevation of the husking mechanism unit, only a few of the teeth of the concave, for the sake of clearness, being shown.

Fig. 3 is a detail side elevation, on an enlarged scale, with parts broken away, of portions of the concave and wheel member of the husking unit.

Fig. 4 is a detail transverse section of the husking mechanism.

Fig. 5 is a detail perspective of one of the knives and plunger rods of the concave.

Fig. 6 is a detail view of one of the knives of the concave.

Fig. 7 is a perspective view of one of the end knives of the husking cylinder wheel.

Fig. 8 is a similar view of one of the intermediate knives of the husking wheel.

Fig. 9 is a detail view of one of the knife spacing members of the husking wheel.

Fig. 10 is a detail side elevation of the cracking mechanism unit having indicated therein diagrammatically nuts of varying sizes and shapes and the engagement of the same by the revolving roll and fixed block or member during the cracking operation.

Fig. 11 is a top plan view of the cracking mechanism unit.

Fig. 12 is a longitudinal section of a palm nut of the kind hereinbefore referred to.

While in the drawings is illustrated one embodiment of the invention, it will of course be understood that changes and obvious variations of the particular construction, combinations and arrangements of parts shown, and the carrying out of the invention in other forms, as will appeal to those skilled in the art, and falling within the scope of the appended claims, may be practiced without departing from the spirit of the invention.

In Figure 12 of the drawings is illustrated a palm nut, such nuts having an outer fibrous husk $a$ about one eighth (1/8) inch thick, and beneath the husk an exceedingly hard shell $b$ requiring from eighteen hundred (1800) to two thousand (2000) pounds steady pressure to break it, the shell being fairly brittle and from one quarter (1/4) to three eighths (3/8) of an inch thick. $c$ designates the kernel of the nut which is about the size and shape of a medium size pecan.

Any suitable form of supporting frame for the husking and cracking mechanism may be employed, the construction of frame shown having side bars 1 and pairs of horizontally extending bars 2, 3, 4 and 5. The husking mechanism is shown arranged at the upper part of the frame. Referring to a detail description of the particular husking mechanism shown, reference being had particularly to Figures 2 to 9 inclusive of the drawings, 6 designates the revolving wheel member having a peripheral part 6ª, and 7 is the concave fixedly supported at one side of the wheel member to extend opposite and eccentrically thereto, the lower portion of the concave being nearer to the outer face of the peripheral part 6ª of the wheel member than the upper entrance part thereof. Provision is made for adjusting one of said members relatively to the other. In the construction shown the concave 7 is mounted for adjustment relatively to the wheel member 6. The wheel member 6 is fixed on a shaft 8 supported for rotation in bearings 9 on the horizontal bars 3. The concave 7 is connected at its ends with the horizontal bars 2, 4, by shafts 10, 11, extending through openings in the concave and having projecting end portions mounted in journal boxes 12, 13. The boxes 12, 13, are provided with apertured flanges 12', 13', and said boxes are clamped to the bars 2, 4, by bolts and nuts 14, 15, the bolts passing through elongated openings in said bars. 16, 17 designate pairs of adjusting screws, each having a threaded engagement with one of the bars 2, 4, and engaging the bottom faces of one of the journal boxes 12, 13. As will be understood this construction provides for the adjustment of the journal boxes 12, 13, both vertically and horizontally, and for the nice adjustment of the concave 7 relatively to the face of the peripheral part 6ª of the wheel member 6 to vary the spacing and eccentric relationship.

The wheel member 6 and concave 7 are provided with series of knives 18, 19, arranged in parallel transverse rows at regular intervals throughout the faces thereof, said knives being provided with cutting edges 18', 19', formed concave in the direction of their length and disposed transversely of said parts. Each of said rows contain the same number of knives similarly spaced. In the construction shown, each row consists of three knives, a main central one, with a smaller knife at either side thereof. The knives 18 of the wheel member are fixedly mounted thereon. They are provided with inclined side faces, as shown, and detachably seated in dove tail grooves 20 extending transversely in the face of the peripheral part 6ª of the wheel member. 21 designates spacing blocks of dovetail form seated in the grooves 20, and 22 are set screws having a threaded engagement with the peripheral part 6ª of the wheel and engaging the spacing blocks 21 located at the ends of the rows to secure the knives in place.

The knives 19 of the concave 7 are mounted thereon for independent movement relative thereto, and spring pressure means is provided for each of the knives 19 for exerting an outward pressure thereon, said means being adjustable to vary the amount of pressure. Means is also provided for regulating the distance the knives project beyond the face of the concave. Each knife 19 is provided with a plunger rod 23 having an enlarged head part 23ª at one end, which is slotted to receive the blade of the knife, and the knife is secured thereto by a pin 24. The head part 23ª of the plunger 23 and the knife 19 slidably engages a way 25 extending radially through the concave, and the rod at its other end slidably engages a sleeve 26 on an arcuate shaped frame 27 extending in the rear of and rigidly secured at its ends to the concave. The outer end of the rod 23 extends through the sleeve 26 and has a threaded outer end portion 28 to cooperate with an adjusting nut 29. The sleeves 26 are externally threaded and adjustably engage threaded openings in the frame part 27. 30 designates coiled expansion springs on the rods 23 interposed between loose collars 31, 32, abutting against the frame part 27 and the head parts 23ª of the rods 23, said springs exerting pressure outwardly upon the knives 19 and acting to yieldably maintain the same in an outer position. As will be understood by adjusting the sleeves 26 the springs 30 can be adjusted to vary the pressure exerted upon the knives 19, and the distance the knives 19 project from the face of the concave 7 can be regulated by adjusting the nuts 29. The peripheral portion 6ᵃ of the wheel member 6 is of a width substantially the same as the width of the concave and projecting forwardly from the concave and overlapping the portions 6ᵃ of the wheel member 6 are plates 33, which serve as a housing to prevent the nuts from escaping from between the husking elements at the sides thereof. 34 designates a hopper and chute, which may be supported in any suitable way, not shown, for feeding the nuts to the husking mechanism. The wheel member 6 is adapted to be rapidly revolved, and as the nuts are fed thereto from the chute 34 the nuts will be rapidly rolled to the concave by the wheel member, the knives of the concave cooperating with those of the wheel to grip and hold the nuts from turning, and to tear and peel the husks therefrom, the independently movable spring pressed knives 19 of the concave automatically adjusting themselves to nuts of varying sizes and shapes.

Referring now to a detail description of the cracking mechanism, see particularly Figures 10, 11 and 12 of the drawings, 35 designates the rotary roll member and 36 the fixed incline of the unit, the latter preferably, as shown, being in the form of a solid block having a face 36ᵃ at one side extending in an inclined plane. The rotary roll 35 has journals 35ᵃ at its ends, supported in bearings 37 on the horizontal bars 5. The incline or block 36 is mounted on the bars 5 with its inclined face 36ᵃ disposed opposite to the upper half of the cracking roll 35 in spaced relation therewith and extending downwardly toward the same, the sloping face of the block or fixed member 36 and the curvature of the opposing face of the roll member 35 providing a space therebetween which gradually decreases in width or tapers downwardly from the upper entrance end of the unit. The block or fixed member 36 is firmly secured to the bars 5 by bolts 37ᵃ or equivalent fastening means. Means is provided for adjusting one of the cracking elements toward and from the other to vary the spacing thereof. For this purpose the bars 5 are provided with elongated openings 38, and the bearings 37 of the roll 35 are clamped to the bars by bolts and nuts 39, 40, the bolts extending through apertured flanges 41 of the bearings and the elongated openings 38 in the bars 5. 42 designates pairs of adjusting screws, each having a threaded engagement with one of the bars 5 and extending upwardly therethrough and engaging the bottom face of one of the bearings 37. By loosening the nuts 39 the bearings 37 may be shifted horizontally on the bars 5, and they may be adjusted vertically through the medium of the adjusting screws 39 and 40. The inclined face of the block or fixed member 36 is roughened and the roll member is also provided with a roughened outer face. Both the fixed member or block 36 and the roll member 35 are preferably constructed of steel, or other suitable metal and serrated to provide file like roughened surfaces throughout inclined face 36ᵃ of the block and the outer face of the roll. The roughened face 36ᵃ of the block 36 is preferably formed, as shown, of rows of fine teeth that are triangular shape in cross section having downwardly inclined faces 43 and adjoining abruptly extending bottom faces 44. The face of the wheel is shown provided with series of small corrugations or ribs 45 extending throughout the face thereof, the faces of said ribs 45 and the face portions therebetween being finely serrated. 46 designates plates suitably secured to the ends of the fixed member or block 36 and extending forwardly therefrom in overlapping relation with the ends of the roll member 35 to prevent the nuts from escaping at the sides of the unit from between the cracking elements.

In the operation of the nut cracking mechanism, the roll member 35 is rapidly rotated, and as the nuts are fed to the mechanism, they are gradually drawn into the downwardly tapering space between the incline and the roll member until a point is reached, depending upon the size and shape of the nut, where a pinching pressure is applied to the nut below the central part thereof to break the same, the fine file like teeth of the roughened surface of the incline and the teeth of the roughened surface of the roll member acting to grip and hold the nuts against slipping from the incline and roll member during the breaking operation. As the shells of the nut break under this pinching action applied below the central part of the nut, the broken nut is caused to fly outwardly from the roll and incline, and then drops back by gravity and falls between the block and roll member and is discharged therefrom. As the nuts are caused to fly upwardly as the result of the breaking operation, this tends to separate the broken parts of the nut from each other. The diameter of any parts of the broken nut will be less than the distance between the lower end of the block or fixed member 36 and the roll member 35 so that the cracked nuts readily find a passage between the block and the roll member and are discharged therefrom without injury to the kernels.

Any suitable means, not shown, is employed for driving the wheel member 6 and the roll member 35 of the husking and cracking mechanisms.

Any suitable means may be employed for separating the husks from the husked nuts and the shells from the kernels. In the particular construction shown in the drawings, 46' designates a discharge chute leading from the discharge end of the husking mechanism to an inclined chute 47, intermediate the ends thereof, the latter chute at its lower end leading to the entrance of the cracking mechanism, and at its upper end having an angularly disposed discharge spout 48. 49 designates a horizontally extending passage or casing communicating at one end with the inclined chute 47 at a point above the entrance to the cracking mechanism and below the point of communication therewith of the discharge chute 46'. 50—51 designate discharge chute portions leading from the cracking mechanism. 52 is a horizontally extending casing or passage communicating at one end with the discharge chute portion 49 at one side thereof, and 53 is a horizontally extending discharge chute portion having its inner end disposed opposite to the inner end of the casing 52 and communicating with the discharge chute portion 50. Suitable air forcing means (not shown) is connected with the horizontally extending casings or passages 49—51² to provide a blast of air therethrough in the direction of the arrows. As the husks and husked nuts are discharged from the discharge chute 46' of the husking mechanism into the inclined chute 47, they are subjected to an upwardly directed air blast from the casing or passage 49 the lighter husk particles being blown off through the discharge spout 48, the heavier husked nuts passing downwardly to the cracking mechanism. The broken nuts from the cracking mechanism pass to the discharge portion 50 and are subjected to an air blast from the passage 52 the kernels being blown off through the discharge chute portion 53 while the heavier shell portions pass downwardly through the discharge chute portion 51.

By the special mechanism hereinbefore described, a machine is provided that will effectually husk and crack nuts of various sizes and shapes and different degrees of toughness and hardness at the same operation without injury to the kernels, the necessity for previous sorting and grading of the nuts and machines and work incidental to this preliminary sorting and grading, being entirely avoided so that the work of husking and cracking is much simplified and can be carried on twice as rapidly, and at one half less expense. It will also be observed that the particular cracking mechanism functions to apply the breaking force to the nuts in such a manner that the cracking is effected with the minimum pressure required and without injury to the kernels, the breaking force being always exerted on the nuts below the central parts thereof, irrespective of the size and shape of the nut, the breaking operation being in the nature of a pinching action as distinguished from an impact or crushing action as in machines heretofore employed for this purpose.

What we claim is:

1. In a machine of the class described, husking mechanism comprising a rotary wheel member, and a cooperating concave, one of said members being provided with knives projecting outwardly from the face thereof, said knives being mounted on said member for independent movement relatively thereto, and means for maintaining the knives in an outer position under yielding pressure.

2. In a machine of the class described, husking mechanism comprising a rotary wheel member, and a cooperating concave, one of said members being provided with knives projecting outwardly from the face thereof, said knives being mounted on said member for independent movement relatively thereto, and adjustable means for maintaining the knives in an outer position under yielding pressure.

3. In a machine of the class described, husking mechanism comprising a rotary wheel member, and a cooperating concave, one of said members being provided with knives projecting outwardly from the face thereof, said knives being mounted on said member for independent movement relatively thereto, means for maintaining the knives in an outer position under yielding pressure, and means for adjusting the distance the knives normally project from said member.

4. In a machine of the class described, husking mechanism comprising a rotary wheel member and a cooperating concave member, one of said members being provided with a series of knives arranged in rows extending transversely of and projecting from the face thereof, the knives being mounted on said member for independent movement relatively thereto, and means for each knife for maintaining the same in an outer position under yielding pressure.

5. In a machine of the class described, husking mechanism comprising a rotary wheel member and a cooperating concave, one of said members being provided with a series of knives arranged in rows transversely of and projecting from the face thereof, said knives being mounted on said member for independent movement relatively thereto, and spring means exerting outward pressure upon the knives and acting to yieldably maintain them in an outer position, and the other of said members being provided with knives fixedly mounted thereon in rows extending transversely of and projecting from the face thereof.

6. In a machine of the class described, husking mechanism comprising a rotary wheel member, and a cooperating concave member, the concave member being provided with a series of knives arranged in rows transversely of and projecting from the face thereof, said knives being mounted on said member for independent movement relatively thereto, and spring means exerting outward pressure upon the knives and acting to yieldably maintain them in an outer position, and the rotary wheel member being provided with knives fixedly mounted thereon, and arranged in rows transversely of and projecting from the face thereof.

7. In a machine of the class described, husking mechanism including a rotary wheel member, and a cooperating concave member, one of said members being provided with series of knives arranged in rows transversely of and projecting from the face thereof, said knives being slidably mounted on said member for independent movement relatively thereto, and coiled springs interposed between the knives and said member exerting an outward pressure upon the knives and acting to yieldably maintain them in an outer position.

8. In a machine of the class described, husking mechanism including a rotary wheel member, and a cooperating concave member, one of said members being provided with series of knives arranged in rows transversely of and projecting from the face thereof, said knives being slidably mounted on said member for independent movement relatively thereto, and coiled springs interposed between the knives and said member exerting an outward pressure upon the knives and acting to yieldably maintain them in an outer position, and means for adjusting the coiled springs to vary the amount of pressure exerted thereby upon the knives.

9. In a machine of the class described, husking mechanism comprising a rotary wheel member and a concave member, the wheel member and concave member being provided with knives projecting from the faces thereof, said knives being disposed with their cutting edges extending transversely of the wheel and concave.

10. In a machine of the class described, husking mechanism comprising a rotary wheel member and a concave member, the wheel member and concave being provided with series of knives arranged in rows extending transversely and projecting from the faces thereof, the knives being disposed with their cutting blades extending transversely of the wheel and concave.

11. In a machine of the class described, husking mechanism comprising a rotary wheel member and a concave, the wheel member and concave being provided with knives projecting from the faces thereof, said knives having cutting blades of concave form, said blades being disposed to extend transversely of the wheel and concave.

12. In a machine of the class described, husking mechanism comprising a rotary wheel member and a concave member, the wheel member and concave being provided with series of knives arranged in transverse rows at regular intervals along and projecting from the faces thereof, the cutting edges of the knives being disposed transversely of the wheel and concave.

13. In a machine of the class described, husking mechanism comprising a rotary wheel member, and a concave member, the wheel member and concave being provided with knives projecting from the faces thereof, said knives being disposed with their cutting edges extending transversely of the wheel and concave, one of said members being adjustable relatively to the other.

14. In a machine of the class described, husking mechanism comprising a rotary wheel member and a concave member, the wheel member and concave being provided with series of knives arranged in transverse rows at intervals along and projecting from the faces thereof, said concave member being adjustable relatively to the rotary wheel member.

15. In a machine of the class described, the combination of nut husking mechanism comprising a rotary wheel member and a cooperating concave member, both of said members being provided with series of knives projecting from the faces thereof, the knives of one of said members being mounted on said member for independent movement relatively thereto, means for maintaining the knives in an outer position under yielding pressure, nut cracking mechanism comprising a rotary roll member provided with a roughened face, and a cooperating member having a sloping roughened surface, said member being arranged with its sloping roughened face disposed opposite to an upper part of the roll member in spaced relation therewith and extending toward the same, and means interposed between the nut husking mechanism and the nut cracking mechanism for separating the husks and the husked nuts delivered from the husking mechanism, and for conveying the husked nuts to the cracking mechanism.

16. In a machine of the class described, the combination of nut husking mechanism comprising a rotary wheel member and a cooperating concave member, both of said members being provided with series of knives projecting from the faces thereof, the knives of one of said members being mounted on said member for independent movement relatively thereto, and means for maintaining the knives pressed outwardly with a yielding pressure, nut cracking mechanism comprising a rotary cylindrical roll member provided with a roughened surface, and a member having a roughened face extending in an inclined plane, said member being arranged with its inclined roughened face disposed opposite an upper portion of the roll member in spaced relation therewith and extending toward the same, and means interposed between the nut husking mechanism and the nut cracking mechanism for separating the husks and the husked nuts delivered from the husking mechanism, and for conveying the husked nuts to the cracking mechanism.

17. In a machine of the class described, the combination of nut husking mechanism comprising a rotary wheel member and a cooperating concave member, both of said members being provided with a series of knives projecting from the faces thereof, the knives of one of said members being mounted on said member for independent movement relatively thereto, means for maintaining the knives in an outer position under yielding pressure, one of said members being adjustable relatively to the other, nut cracking mechanism comprising a rotary roll member provided with an outer roughened corrugated face, and a cooperating member having a sloping roughened surface, said member being arranged with its sloping roughened face disposed opposite to an upper part of the roll member in spaced relation therewith and extending toward the same, and means interposed between the nut husking mechanism and the nut cracking mechanism for separating the husks and the husked nuts delivered from the husking mechanism, and for conveying the husked nuts to the cracking mechanism.

18. In a machine of the class described, the combination of nut husking mechanism including a revolving wheel member and a concave provided with husk peeling means automatically adjustable to operate on nuts of varying sizes and shapes, in combination with nut cracking mechanism constructed and arranged to simultaneously operate on nuts varying in size and shape, and means interposed between the nut husking mechanism and the nut cracking mechanism for separating the husks and the husked nuts delivered from the husking mechanism, and for conveying the husked nuts to the cracking mechanism.

19. In a machine of the class described, husking mechanism comprising a rotary wheel member and a cooperating concave member, the wheel member and concave member being provided with knives projecting from the faces thereof, the knives of one of said members being slidably supported thereon for independent radial movement and said member having spring means exerting pressure upon the knives and acting to yieldably maintain them in an outer position.

20. In a machine of the class described, the combination of nut husking mechanism constructed to simultaneously remove husks from nuts of varying sizes and shapes in combination with nut cracking mechanism constructed and arranged to simultaneously operate on nuts of varying sizes and shapes, and means interposed between the nut husking mechanism and the nut cracking mechanism for separating the husks and the husked nuts delivered from the husking mechanism, and for conveying the husked nuts to the cracking mechanism.

In testimony whereof we hereunto affix our signatures.

CHARLES ANDREW HOPKINS.
MILTON ROBERT WOOD.